US010486619B2

(12) United States Patent
Li et al.

(10) Patent No.: US 10,486,619 B2
(45) Date of Patent: Nov. 26, 2019

(54) CONNECTION ASSEMBLIES IN A VEHICLE

(71) Applicant: Ford Global Technologies, LLC, Dearborn, MI (US)

(72) Inventors: Tina Li, Nanjing (CN); Yong Gao, Nanjing (CN); Hallie Ge, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 170 days.

(21) Appl. No.: 15/633,606

(22) Filed: Jun. 26, 2017

(65) Prior Publication Data

US 2018/0370456 A1   Dec. 27, 2018

(30) Foreign Application Priority Data

Jul. 5, 2016 (CN) .......................... 2016 1 0525771

(51) Int. Cl.
*B60R 7/00* (2006.01)
*B60R 13/02* (2006.01)
*F16B 5/06* (2006.01)
*F16B 5/12* (2006.01)
*F16B 17/00* (2006.01)
*F16B 21/09* (2006.01)

(52) U.S. Cl.
CPC ...... *B60R 13/0243* (2013.01); *B60R 13/0206* (2013.01); *F16B 5/0685* (2013.01); *F16B 5/121* (2013.01); *F16B 5/126* (2013.01); *F16B 17/008* (2013.01); *F16B 21/09* (2013.01)

(58) Field of Classification Search
CPC .................................. H01R 13/639; F16L 5/00

USPC ............ 439/153, 160, 347, 557; 248/220.21, 248/223.41, 224.51, 224.61, 224.8, 248/225.11, 224.7
See application file for complete search history.

(56) References Cited

U.S. PATENT DOCUMENTS

| 5,732,916 | A | * | 3/1998 | Gordon | .................. | B60K 37/04 |
|---|---|---|---|---|---|---|
| | | | | | | 248/220.31 |
| 6,045,400 | A | * | 4/2000 | Detter | ...................... | H01R 9/16 |
| | | | | | | 439/532 |
| 6,994,504 | B2 | * | 2/2006 | Gordon | .................. | F16B 21/088 |
| | | | | | | 411/45 |
| 7,520,764 | B2 | | 4/2009 | Lee et al. | | |
| 7,544,889 | B1 | * | 6/2009 | Sanchez | .................. | H02G 3/126 |
| | | | | | | 174/53 |
| 8,448,829 | B2 | * | 5/2013 | Watanabe | ............ | H05K 5/0204 |
| | | | | | | 224/545 |

(Continued)

FOREIGN PATENT DOCUMENTS

DE    102010029509 A1    1/2011
EP        2141778 A1        1/2010

(Continued)

*Primary Examiner* — Steven M Marsh
(74) *Attorney, Agent, or Firm* — Vichit Chea; Koltich Romano LLP

(57) ABSTRACT

A connection assembly in a vehicle comprises a bracket including a sliding groove; and a connector including a base plate configured to be received in the sliding groove of the bracket. The base plate or an inner wall of the sliding groove has a raised portion and a through hole on the raised portion. At a locked position, the base plate is at least partially received in the sliding groove and contacts the inner wall of the sliding groove under a pressure via the raised portion.

13 Claims, 6 Drawing Sheets

(56) References Cited

U.S. PATENT DOCUMENTS

2015/0244104 A1    6/2015   Choo et al.
2016/0079706 A1    3/2016   Grudzewski et al.

FOREIGN PATENT DOCUMENTS

WO        9826957 A1    6/1998
WO    2015165917 A1   11/2015

* cited by examiner

CONNECTION ASSEMBLIES IN A VEHICLE

RELATED APPLICATION

This application claims the benefit of Chinese Patent Application No.: CN 201610525771.1 filed on Jul. 5, 2016, the entire contents thereof being incorporated herein by reference.

FIELD

This application relates to a connection assembly used in a vehicle, in particular relates to a connection assembly that provides a firm contact between a bracket and a connector.

BACKGROUND

A vehicle usually includes a variety of connection assembly to attach different parts and panels. For example, a wiring holder assembly is used to glasp the wiring in the vehicle. In another example, a trim panel assembly is used to fix the trim panel to a vehicle door. A connector is usually connected to an assembling bracket via a clip or a sliding rail. However, a gap usually exists between the connector and the assembling bracket and thus the connector cannot rest on the assembling bracket firmly. When the vehicle is bumping, the collision between the connector would generate squeak and rattle. Further, the connector and the assembling bracket may be worn out after long time of use.

SUMMARY

To address at least some of the issues described above, a connection assembly for a vehicle is provided to firmly connect the parts, such as wiring and a trim panel.

According to one aspect of the present disclosure, a connection assembly in a vehicle is provided. The connection assembly comprises a bracket including a sliding groove; and a connector including a base plate configured to be received in the sliding groove of the bracket. The base plate or an inner wall of the sliding groove includes a raised portion and a first through hole on the raised portion. At a locked position, the base plate is at least partially received in the sliding groove and contacts the inner wall of the sliding groove under a pressure via the raised portion.

In one embodiment, the raised portion is integrated formed with the inner wall of the sliding groove or the base plate of the connector.

In another embodiment, the connector includes a hook and the bracket includes a clip or a slot capable of being engaged with and released from the hook.

In another embodiment, the base plate includes the raised portion and further includes at least one second through hole at a middle portion of the base plate.

In another embodiment, the connector is a wiring holder in a vehicle.

In another embodiment, the connector is a trim panel on a vehicle door.

According to another aspect of the present disclosure, a connection assembly in vehicle comprise a bracket and a connector. The bracket includes a main surface and at least one sliding groove positioned on an edge of the main surface along a lengthwise direction and having an inner wall facing an opening of the sliding groove, and the bracket is mounted on the vehicle. The connector includes a base plate having a main surface, at least one raised portion extending from an edge of the main surface of the base plate at a widthwise direction of the base plate, and a first through hole on the raised portion. At a locked position, at least a portion of the base plate is received in the sliding groove, and the raised portion of the base plate contacts the inner wall of the sliding groove under a pressure.

In one embodiment, the base plate includes two raised portions along the lengthwise direction, and two first through holes are disposed on the raised portions. The through holes render elasticity to the base plate and facilitate deformation of the raised portion during an assembling process.

In another embodiment, the base plate further includes a second through hole positioned in a middle portion of the base plate to further increase elasticity of the base plate.

In another embodiment, the connector includes a hook and the main surface of the bracket includes a clip and the hook engages with the clip at the locked position.

In another embodiment, the base plate includes a projection protruded from a bottom surface at a direction perpendicular to the bottom surface and positioned at a middle portion of the base plate, and the bracket includes a recess concaved from the main surface. The projection is received in the recess to prevent further movement at the locked position.

In another embodiment, the bracket includes two sliding grooves, and both edges of the base plate include the raised portions, and the raised portions contact the inner walls of the two sliding groove, respectively at the locked position.

In another embodiment, the connector is a wiring holder in the vehicle and further includes a wiring grasp member disposed above the base plate and configured to hold a wiring.

According to another aspect of the present disclosure, a connection assembly in a vehicle comprises a bracket and a connector. The bracket includes a first sidewall, a second sidewall parallel to and spaced apart from the first sidewall, and a bottom wall, which form a sliding groove with a receiving space, and the bottom wall includes at least one raised portion protruded inward the receiving space. The connector includes a base plate and at least one through hole on the base plate. At least a portion of the base plate is received in the sliding groove and an edge of the base plate contacts the raised portion with a pressure at a locked position.

In one embodiment, the base plate of the connector includes a plurality of through holes, and one side of the base plate includes a hook protruded from a main surface and a second sidewall of the sliding groove includes a slot to receive the hook to be connected with the connector.

In another embodiment, the slot is positioned above the raised portion and the hook is above the raised portion at the locked position.

In another embodiment, the bracket includes two raised portions along a lengthwise direction and the base plate includes two hooks. The plurality of through holes are positioned between the two hooks.

In another embodiment, the connector is a trim panel on a vehicle door.

The connection assembly of the present disclosure comprises a connector and a bracket being locked and unlocked each other. A base plate of the connector contacts an inner wall of the sliding groove of the bracket via a raised portion under a pressure. Thus, the raised portion rests on the sliding groove or the base plate upon icompletion of the assembling process to eliminate a gap between the connector and the bracket to prevent squeak and rattle due to collision between the connector and the bracket while the vehicle is bumping.

In addition, since the connector is usually made from rigid material, the raised portion includes at least one through hole to render elasticity so that the raised portion is deformed easily to facilitate the assembling.

DESCRIPTION OF DRAWINGS

Example embodiments will be more clearly understood from the following brief description taken in conjunction with the accompanying drawings. The accompanying drawings represent non-limiting, example embodiments as described herein.

it should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed connection assemblies will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various connection assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
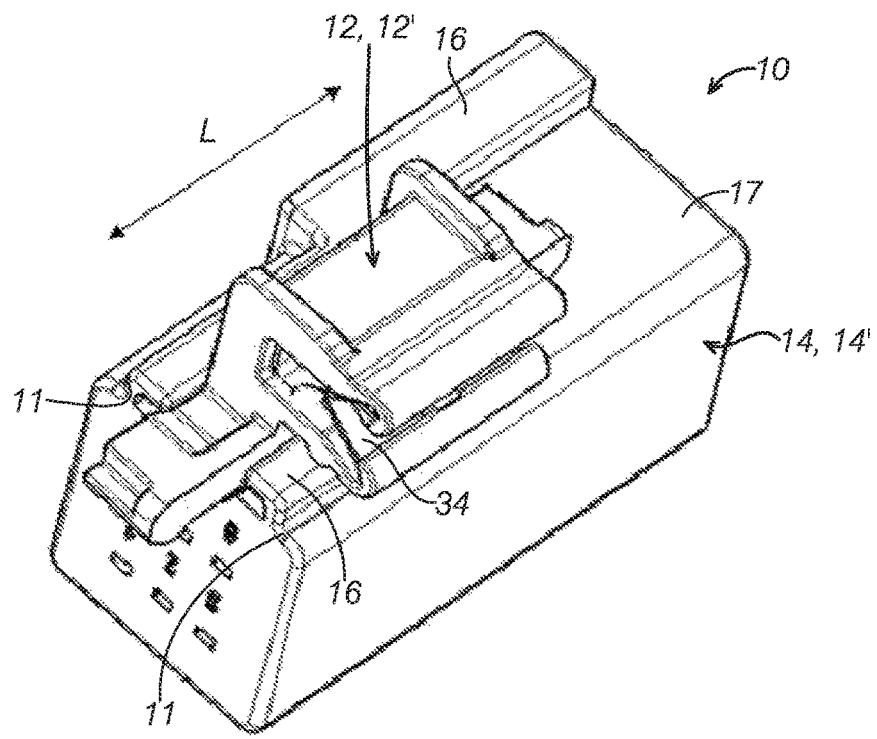
FIG. 1 is a perspective view of a connection assembly according to one embodiment of the present disclosure.

Referring to FIGS. 1 to 4, a connection assembly 10 in a vehicle according to one embodiment of the present disclosure is provided. The connection assembly 10 includes a connector 12 and a bracket 14. The connector 12 is coupled to the bracket 14 and is lockable and unlockable to the bracket 14. The bracket 14 includes a sliding groove 16 and the connector 12 includes a base plate 18 at least partially received in the sliding groove 16 at a locked position. At the locked position as shown in FIG. 1, the base plate 18 and an inner wall 11 of the sliding groove 16 contact each other under a pressure via a raised portion 20.

The raised portion 20 includes a through hole 22 that passes the raised portion 20. It should be understood that the through hole 22 passing the raised portion 20 means that the hole 22 passes through two surfaces of the raised portion 20. For example, at the locked position shown in FIG. 4, an extension direction of the hole 22 is perpendicular to a pressure direction on the inner wall 11 of the sliding groove at the locked position. That is, perpendicular to a direction of the force F. Thus, when the connector 12 slides along the sliding groove 16 at a direction L to the locked position as shown in FIG. 1, the inner wall 11 of the sliding groove 16 presses on the raised portion 20 such that the base plate 18 is deformed via the through hole 22 that extends in a direction perpendicularly to the direction of the pressure F. The deformation facilitates the assembling process. Further, upon completion of assembling, the raised portion 20 will securely rest on the inner wall 11 of the sliding groove 16 to avoid squeak and rattle due to shaking or vibration.

In the embodiment described above, the connection assembly 10 includes a connector 12 and a bracket 14, which can be locked and unlocked each other. The base plate 18 of the connector 12 contacts the inner wall 11 of the sliding groove 16 under a pressure via the raised portion 20. Upon the completion of the assembling process, the raised portion 20 is pressed against the sliding groove 16 or the bracket 18 such that there is substantially no gap between the connector 12 and the bracket 14. That is, there is no gap between a portion of the sliding groove 16 contacts the raised portion 20. Thus, the connector 12 and bracket 14 will not generate squeak or rattle due to collision each other when the vehicle is bumping. In addition, since the connector 12 is usually a rigid member, at least one through hole 22 is configured to be on the raised portion 20. During the assembling of the connector 12, the raised portion 20 is deformed easily due to the presence of the through hole 22 to facilitate the assembling.

Figure 4:
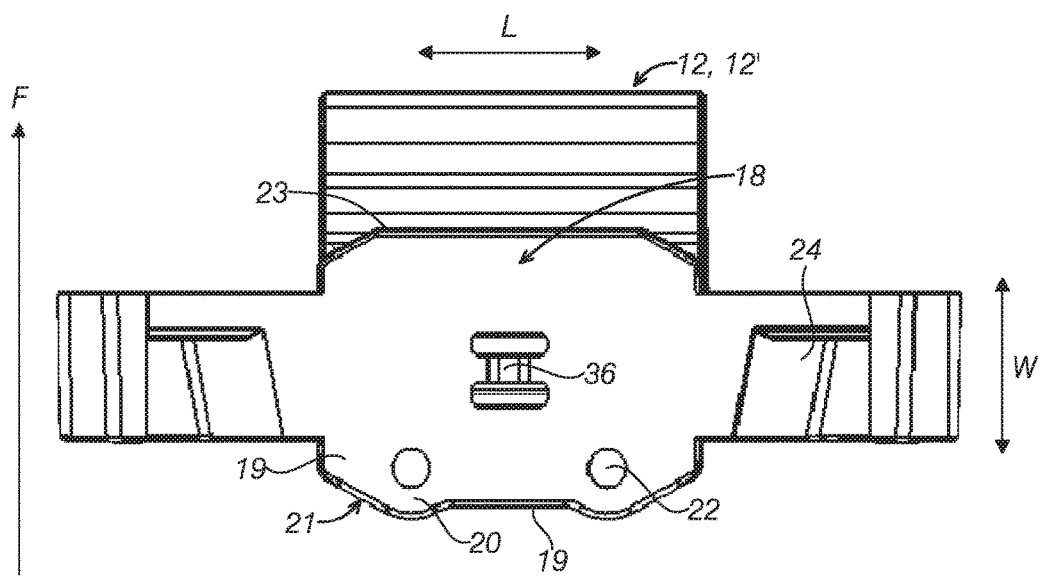
FIG. 4 a bottom view of the connector of the connection assembly in FIG. 1.

In some embodiments, the raised portion 20 may be configured to be disposed along a direction perpendicular to the direction of the force F as shown in FIG. 4. Thus, the raised portion 20 may contact the inner wall 11 of the sliding groove 16 when assembling the connector 12 to the bracket. In the embodiments depicted in FIGS. 2 and 4, the raised portion 20 has a length a lengthwise direction L and a width at a widthwise direction W. The raised portion 20 may protrude from an edge 19 of the base plate 18 at the widthwise direction W. Thus, the raised portion 20 can prevent a movement of the connector 12 relative to the bracket 14 in the widthwise direction W once assembled. In another embodiment not illustrated, the raised portion 20 may also protrude from the edge 19 of the base plate 18 in an angle to a main surface 13 of the base plate 18 (e.g., along a direction up and/or down from the main surface of the base plate 18). In this manner, the raised portion 20 can prevent a movement of the connector 12 in a vertical direction relative to the bracket 14. It should be understood that the raised portion 20 can be configured to be on one of the base plate 18 or the bracket 14 and to be positioned on any direction that makes the connector 12 contact the bracket 11 for the secured connection.

As described above, the raised portion 20 may be configured to be on one of the connector 12 and the bracket 14. In one embodiment, the raised portion 12 is disposed on the inner wall 11 of the sliding groove 16. Upon the completion of the assembling process, the raised portion 20 rests on the base plate 18 to avoid noises and wear when the vehicle is bumping or making.

In some embodiments, the raised portion 20 is formed with or fixed on one of the base plate 18 and the sliding groove 16. For example, the raised portion 20 may be integrally formed with either the base plate 18 or the sliding groove 16 to reduce the cost on production and assembling. In another example, the raised portion 20 may be detachably connected or fixed to the base plate 18 or the sliding groove 16. For example, each of the raised portion 20, the base plate 18, and sliding groove 16 may be a single part, and the raised portion 20 is connected to the base plate 18 or the sliding groove 16 via any appropriate approach such as welding.

Figure 2:
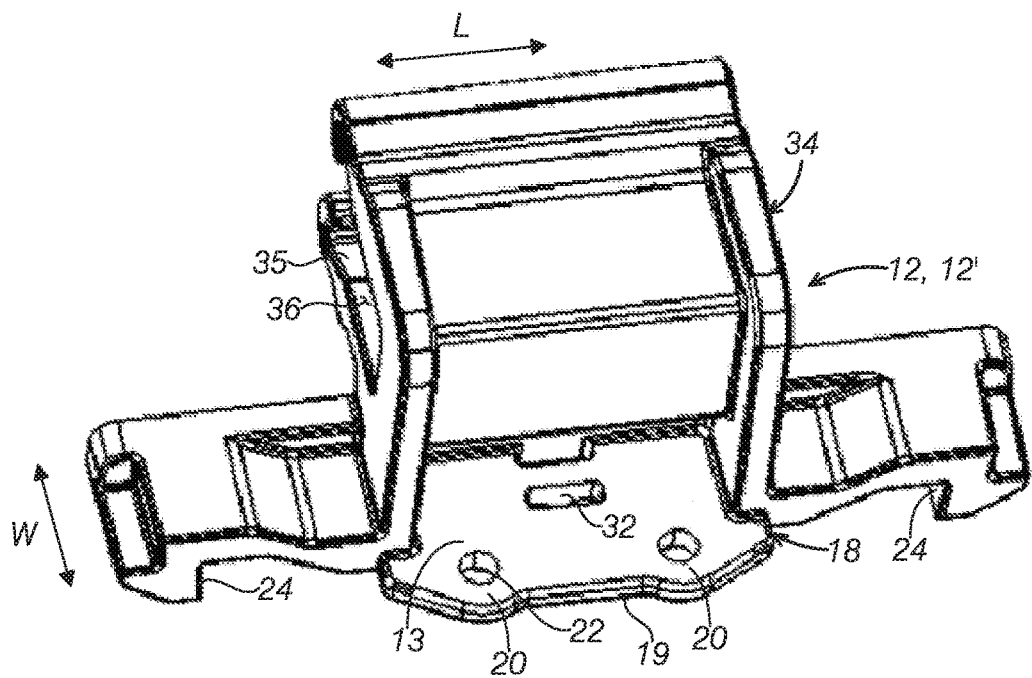
FIG. 2 is a perspective view of a connector of the connection assembly in FIG. 1.
Figure 3:
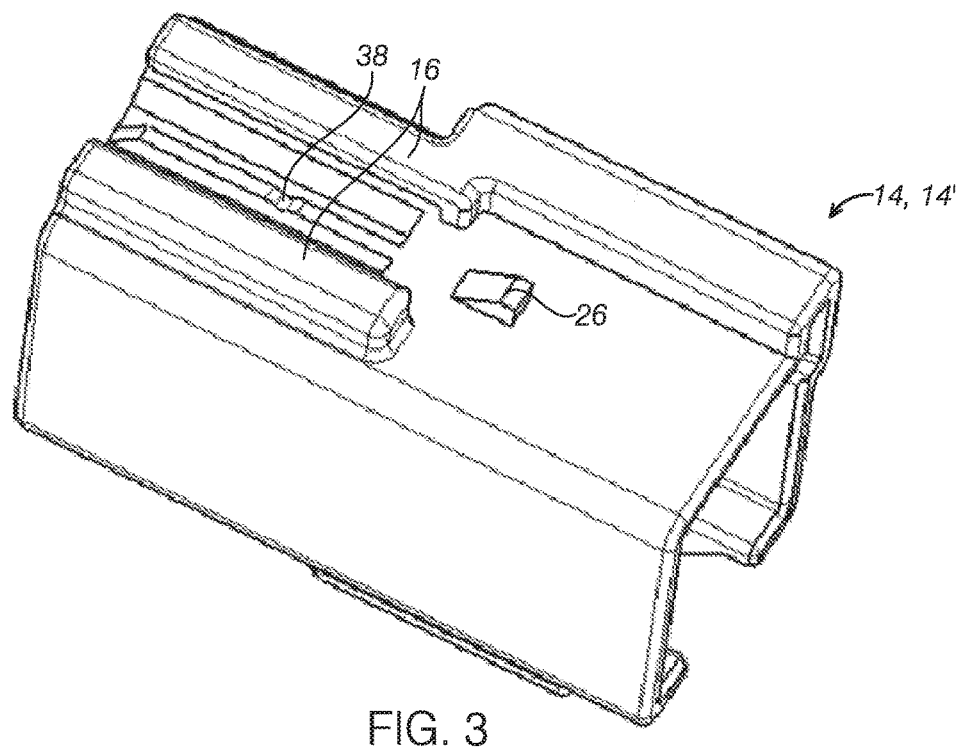
FIG. 3 is a perspective view of a bracket of the connection assembly in FIG. 1.

With reference to FIGS. 2 and 3, the connector 12 may include a hook 24, and the bracket 14 includes a clip 26 attachable or detachable with the hook 24. When the connector 12 slides to the locked position, the hook 24 engages with the clip 26 to secure the connector 12 at the locked position to avoid the separation of the connector 12 from the bracket 16 due to bumping and shaking. In some embodiments, the base plate 18 may be deformed to a certain degree for the hook 24 to be attached into the clip 26. Upon the completion of the assembling process, the hook 24 returns to the original position to connect the clip 26 firmly, to further prevent noise and wear of the connector 12 and bracket 14 due to bumping or collision during the vehicle traveling.

As shown in FIG. 2, a middle portion of the base plate 18 includes at least one second through hole 32. When assembling the connector 12 to the bracket 14, the second through hole 32 provides additional space for the base plate 18 to deform for the ease of the assembling. It should be understood that the second through hole 32 may be located at other positions depending on the configuration of the base plate and the bracket.

Figure 4A:
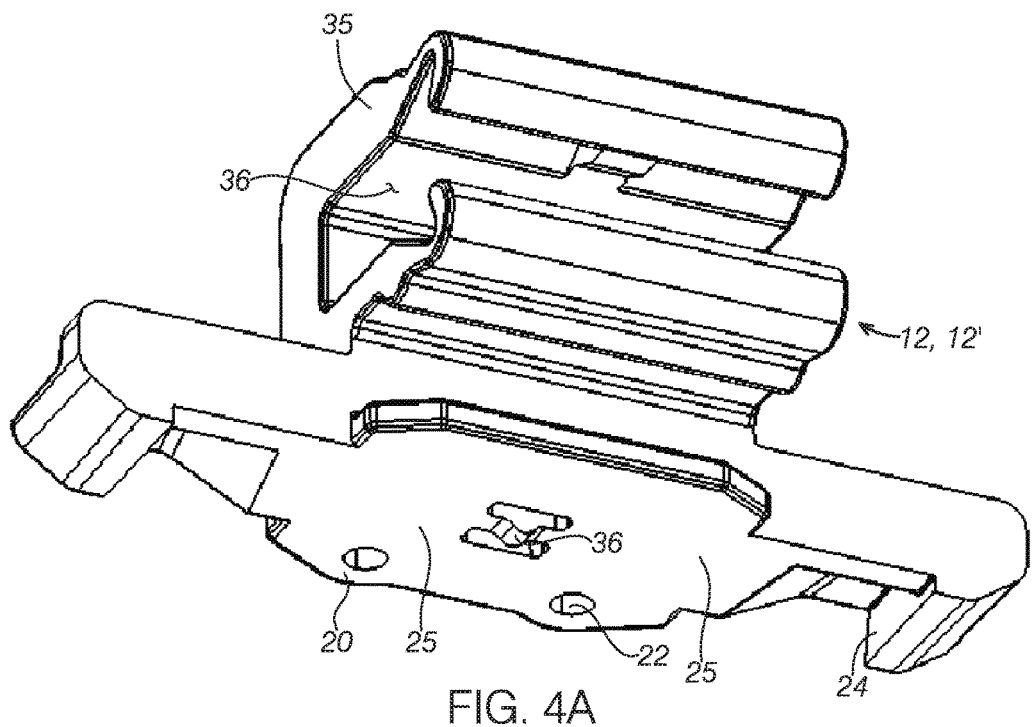
FIG. 4A is another perspective view of the connector of the connection assembly in FIG. 1.

Referring to FIGS. 3, 4, and 4A, a surface of the base plate 18 or the bracket 14 may include a projection 36, and a surface of another of the two of the base plate 18 and the bracket 14 may include a recess 38. At the locked position of the connector 12 with the bracket 14, the projection 36 is received in the recess 38. Upon the completion of the assembling process, the projection 36 rests in the recess 38. In this way, the movement of the connector 12 at the direction of the force F as well as the movement at a direction perpendicular to the force F can be prevented.

In some embodiments, the connector 12 may be a wiring holder for the wiring in the vehicle. In other embodiments, the connector 12 may be a trim panel on a vehicle door. It should be understood that the connection assembly 10 may be used at other positions of a vehicle, such as a hanger assembly in a vehicle. In addition, the connection assembly 10 may also apply to the fields other than automobile, such as ship and vessel.

Referring to FIGS. 1 to 4, the connection assembly is a wiring holder assembly 10 in a vehicle. The wiring holder assembly 10 comprises a bracket 14' mounted on the vehicle and a connector 12' that can be locked and unlocked to the bracket 14'. The bracket 14' includes a main surface 17 and at least one sliding groove 16 positioned on an edge of the main surface 17 a long a lengthwise direction L. The sliding groove 16 has an inner wall 11 facing an opening of the sliding groove. The connector 12' is implemented as a wiring holder 34 connected with the bracket 12'. In the depicted embodiment, the wiring holder 34 includes the base plate 18 and a wiring grasp member 35 positioned above the base plate 18. The wiring grasp member 35 includes an opening 36 to hold the wiring.

The connector 12' includes a base plate 18 having a main surface 13 and is slidable in the sliding groove 16 of the bracket 14'. The base plate 18 includes at least one raised portion 20 extending from an edge 19 at a widthwise direction \V of a main surface 13. The raised portion 20 contacts the inner wall 11 of the sliding groove 16 under a force at a locked position or an assembled position. The raised portion 20 includes a through hole 22. It should be understood that the through hole 22 on the raised portion 20 also refers to the through hole 22 adjacent to an end of the raised portion 20. The through hole 22 passes through two surfaces of the raised portion 20. In other words, when the connector 12' and the bracket 14' are at the locked position as shown in FIG. 1, the extending direction the through hole 22 is perpendicular to the direction of the pressure on the inner wall 11 of the sliding groove 16. That is, the extending direction of the through hole 22 is perpendicular to the direction of the three F as shown in FIG. 4. When the connector 12' slides along the sliding groove 16 to the locked position as shown in FIG. 1, the inner wall 11 of the sliding groove 16 presses against the raised portion 20. Thus, the base plate 18 may be deformed to a certain degree via the through hole 22 extending along the direction perpendicular to the three or the pressure F to facilitate the assembling. Upon the completion of the assembling process, the raised portion 20 will firmly rest on the inner wall 11 of the sliding groove 16 to prevent noises and wear due to shaking.

As described above, the wiring harness assembly includes the connector 12' and the bracket 14' which can be locked and unlocked each other. The base plate 18 of the connector 12' contacts the inner walls 11 of the sliding groove 16 of the first bracket 14' via the raised portion 20 under the pressure. Thus, upon the completion of the assembling process, the raised portion 20 rests on the inner wall 11 of the sliding groove 16 to eliminate a gap between the connector 12' and the bracket 14' to prevent noise caused from collision between the connector 12' and the bracket 14' when the vehicle is bumping. In addition, since the connector 12' is usually made from a rigid piece, the through hole 22 adjacent to the raised portion 20 adds the elasticity to the base plate. Further the base plate 18 may include a second through hole 32 positioned in a middle portion of the base plate to further increase elasticity of the base plate. In this way, the raised portion 20 is easily deformed via the through hole 22 and/or the second through hole 32 to make the assembling easier. The interference is allowed for coupling the wiring holder 12' to the bracket 14'.

In the depicted embodiments, the base plate 18 include two raised portions 20 along the lengthwise direction L and two through holes 22 adjacent to the end of the two raised portions, respectively. Two raised portions 20 provide two contact positions to the inner wall 11 of the sliding groove 16 to further secure coupling. The raised portion 20 includes a curved section or an arc section to smooth the movement of the base plate 18 in the sliding groove 16. It should be appreciated that the base plate may include one raised portion or more than two raised portions and the number of the through holes may correspond to the number of the raised portion.

The depicted embodiment in FIG. 4, only a first side 21 of the base plate 18 includes the raised portions. In other embodiment embodiments, a second side 23 opposite the first side 21 of the base plate 18 may include the raised portion protruded from the main surface 13 of the base plate 18 at the width direction (not shown). The raised portions on the second side 23 may oppose the first raised portions on the first side 21 or may be offset to the raised portions on the first side 21. Such configuration may further secure the connection between the connect 12' and the bracket 14' to present squeak and rattle.

The base plate 18 of the wiring holder 12' may further include a projection 36 protruded from a bottom surface 25 at a direction perpendicular to the bottom surface 25 and positioned at a middle portion of the bottom surface 25 as shown in FIGS. 4 and 4A. The bracket 14' may include a recess 38 concaved from an upper surface as shown in FIG. 3. The projection 36 is received in the recess 38 to prevent further movement at the assembled position.

FIGS. 5 to 10 show another embodiment of the connection assembly 10' in a vehicle. The connection assembly 10' includes a connector 12 and a bracket 14, being locked and unlocked each other. The bracket 14 includes a sliding groove 16, and the connector 12 includes a base plate 18 at least partially received in the sliding groove 16. At a locked position, the base plate 14 contacts an inner wall of the sliding groove 16 under the pressure via the raised portion 20. The raised portion 20 includes at least one through hole 221 passing the raised portion 20. In one embodiment, the connector 12 including a hook 24, and the bracket 14 includes a clip 26 capable of being engaged with and released from the hook 24.

Continuing with FIGS. 5 to 10, the connector assembly 10' is a trim panel assembly in a vehicle door. The connector 12 is implemented as a trim panel 121 to be coupled with the bracket 141. The trim panel assembly 10' comprises an bracket 141 mounted on the vehicle door and including a sliding groove 161; the trim panel 121 capable of being locked and unlocked with the bracket 141 and including a base plate 181 slidable in the sliding groove 161. The inner wall 147 of the bracket 141 includes a raised portion 201 toward an inside of the sliding groove 161. At a locked position, an edge 183 of the base plate 181 contacts the raised portion 201 under a pressure at. A through hole 222 or a recess is formed on the raised portion 201.

As described above, the trim assembly 10' includes the bracket 141 lockable and unlockable with the trim panel 121. The base plate 181 of the trim panel 121 contacts the sliding groove 161 of the assembly bracket 141 via a pressure on the raised portion 201. Upon the completion of the assembling process, the raised portion 201 contacts on the edge 183 of the base plate 181 with a pressure so that there is substantially no a gap between the trim panel 121 and the assembly bracket 141 to prevent squeak or rattle caused from the bumping during a vehicle traveling. In the depicted embodiment, the bracket 141 includes a first sidewall 143 and a second sidewall 145 parallel to and spaced apart from the first sidewall 143, and a bottom wall 147 to form the sliding groove 161 with a receiving space 203. The bottom wall 147 includes at least one raised portion 201 protruded inward the receiving space 203. The trim panel 121 may include the base plate 181 and an upper member 185. The base plate 181 is positioned in the receiving space 203 and the edge 183 of the base plate rests on the raised portion 201 of the bottom wall 147 of the bracket 141 at the assembled position. The bracket 141 includes at least one raised portion 201 formed by the bottom wall 147 protruding inward so that a through hole 221 or a recess is created under the raised portion 201. Thus, the bracket 141 is deformable. Further, since the trim panel 121 is made from rigid material, at least one through hole 40 is formed on the base plate 181 so that the base plate 181 becomes elastic. Thus, it is easy to assembly the trim panel 121 to the bracket 141 due to the presence of one of the through hole 221 on the bottom wall 147 of the bracket and the through hole 40 on the base plate 181 of the trim panel 121.

In the depicted embodiments, the bottom wall 147 includes two raised portions 201 along the lengthwise direction L. Two raised portions 201 provide two contact positions to the edge 183 of the base plate 181 to further secure coupling. The raised portion 201 includes a curved section or an arc section to smooth the movement of the base plate 181 in the sliding groove 161. It should be appreciated that the bottom wall 147 may include one raised portion or more than two raised portions.

Figure 5:
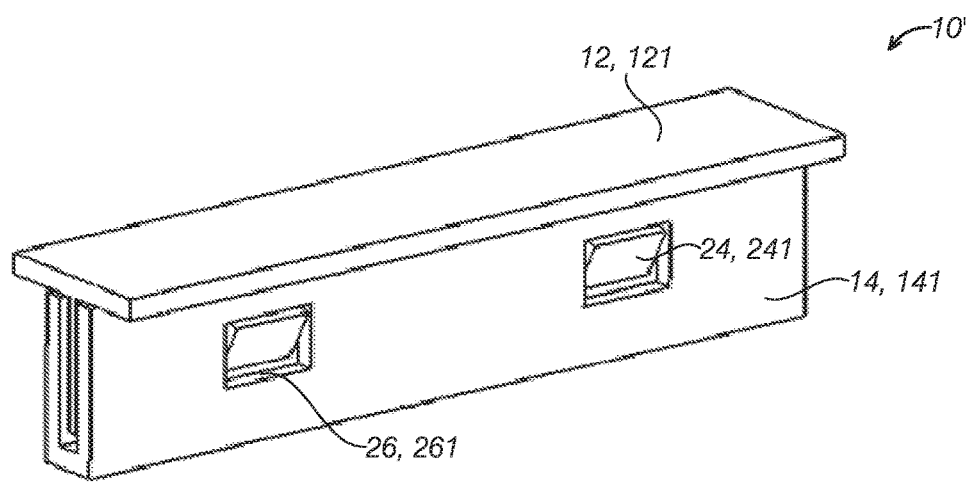
FIG. 5 is a perspective view of a connection assembly according to another embodiment of the present disclosure.
Figure 6:
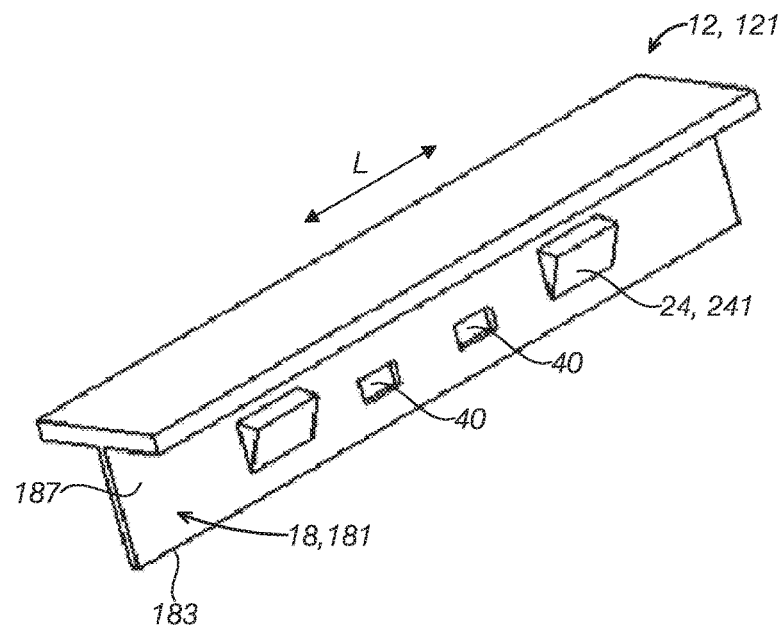
FIG. 6 is a perspective view of a trim panel of the connection assembly in FIG. 5.
Figure 7:
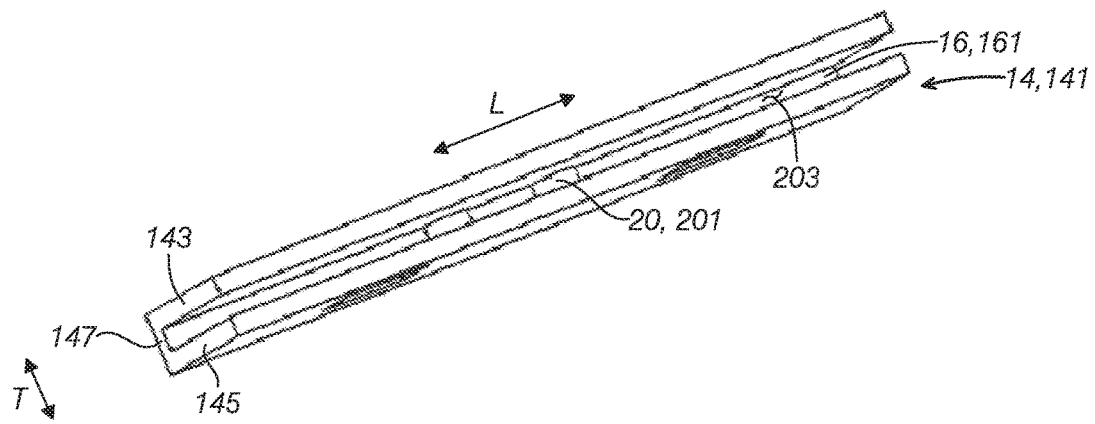
FIG. 7 is a perspective view of a bracket of the connection assembly in FIG. 5.

According to an embodiment as shown in FIGS. 5 to 7, the base plate 181 includes a hook 241 projecting from a main surface 187 of the base plate 181. The second sidewall 145 includes a clip 261 to receive the hook 241. In the depicted embodiment, the clip 261 is implemented as a slot. In some embodiments, the slot 261 is positioned directly above the raised portion 201 such that the hook 241 is above the raised portion 201 at the assembled position. In some embodiments, the raised portion 201 partially defines the slot 261, that is, formed as a bottom of the slot 261, and When the trim panel 121 slides to the position locked with the bracket 141, the hook 241 is received in the slot 261, and the raised portion 201 contacts the base plate 181 under a pressure to eliminate noise caused from the collision of the trim panel 121 with the bracket 141 during the vehicle traveling.

Figure 8:
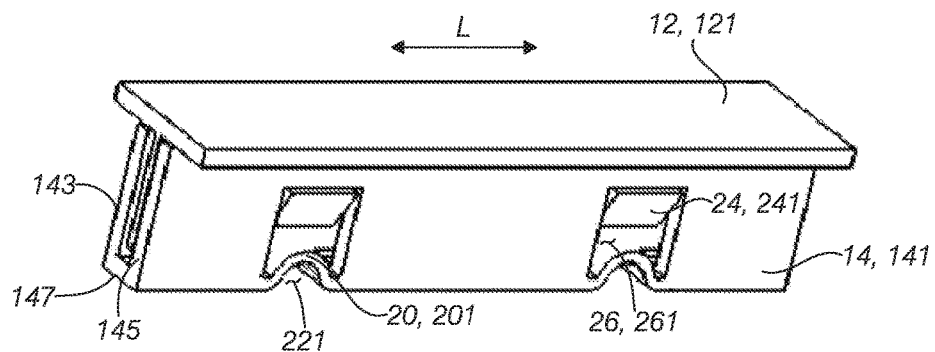
FIG. 8 is another perspective view of the connection assembly in FIG. 5.
Figure 9:
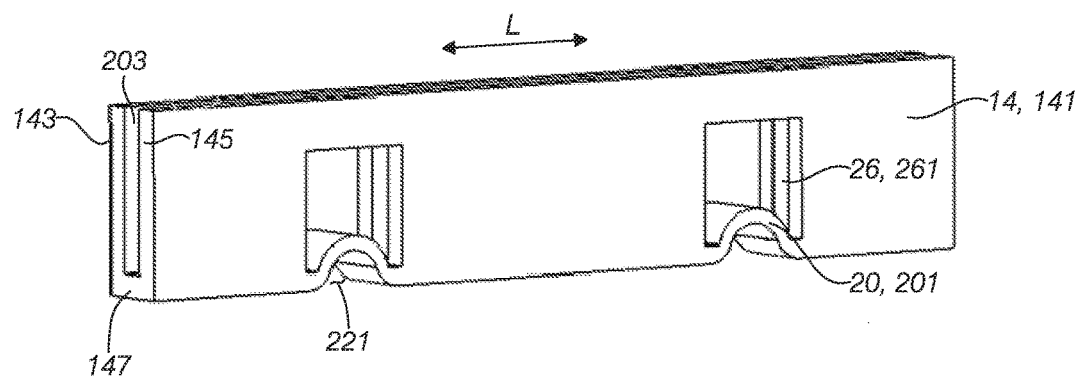
FIG. 9 is another perspective view of the bracket of the connection assembly in FIG. 5.

Referring to FIG. 8, the bottom wall 147 of the bracket 141 include two raised portions 201 and the base plate 181 includes two hooks 241. At the assembled position, two raised portions 201 correspond to two hooks 241 and the edge 183 of the base plate 181 rests on the raised portion 201. It should be appreciated that the number of the raised portions 210 may be equal to the number of the hooks 241.

Figure 10:
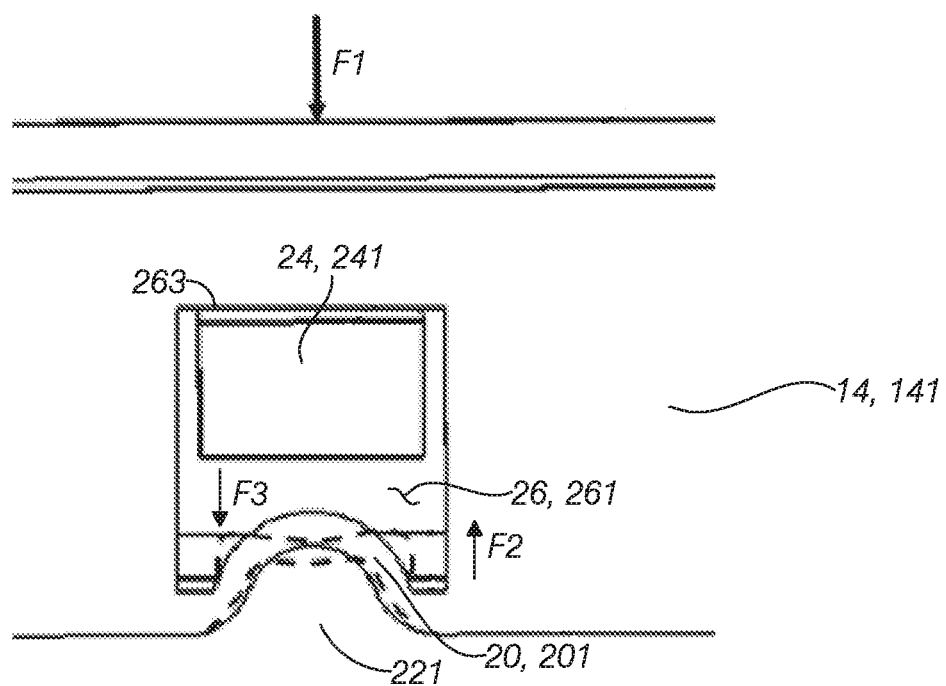
FIG. 10 is a partial enlarged view of the connection assembly in FIG. 5.

Referring to FIG. 10, during the assembling, the raised portion 201 is compressed due to the force F1 applied by the base plate 181 at a F1 direction. The raised portion 201 is changed to a position and shape illustrated by the dash line from a position and shape illustrated by a solid line. After the assembling, the raised portion 201 tends to restore to its original position and force the hook 241 to go up with a force F2 until the hook 241 contacts an upper surface 263 of the slot 261. The upper surface 263 will force the hook 241 to go down under the force F3. Thus, the hook 241 is locked by the forces F2 and F3.

The base plate 181 of the trim panel 121 and the bracket 141 may be configured to have interference connection so that the base plate 181 contacts the bracket 141 under a force to avoid squeak and rattle. Further, the through holes 40 on the base plate render the elasticity to the trim panel 121 and the raised portion 201 further makes the bottom wall of the bracket elastic, which make the assembling process easier due to the deformation.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims nay refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A connection assembly in a vehicle, comprising:
a bracket including a sliding groove, wherein the sliding groove is formed on an edge of the bracket and has an inner wall facing an opening of the sliding groove; and
a connector including a base plate;
wherein the base plate includes a raised portion extending from an edge at a widthwise direction of a main surface of the base plate or the inner wall of the sliding groove includes a raised portion raised toward the base plate, wherein the raised portion includes a first through hole and wherein at a locked position, the base plate is at least partially received in the sliding groove and the raised portion contacts the inner wall of the sliding groove under a pressure.

2. The connection assembly of claim 1, wherein the raised portion is integrally formed with the inner wall of the sliding groove or the base plate of the connector.

3. The connection assembly of claim 1, wherein the connector includes a hook and the bracket includes a clip or a slot capable of being engaged with and released from the hook.

4. The connection assembly of claim 1, wherein the base plate includes the raised portion and further includes at least one second through hole at a middle portion of the base plate.

5. The connection assembly of claim 1, wherein the connector is a wiring holder in the vehicle.

6. The connection assembly of claim 1, wherein the connector is a trim panel on a vehicle door.

7. A connection assembly in a vehicle, comprising:
a bracket, wherein the bracket includes a main surface and at least one sliding groove positioned on an edge of the main surface along a lengthwise direction, the sliding groove has an inner wall facing an opening of the sliding groove, and the bracket is mounted on the vehicle;
a connector, wherein the connector includes a base plate having a main surface, at least one raised portion extending from an edge of the main surface of the base plate at a widthwise direction of the base plate and raised toward the inner wall of the sliding groove, and a first through hole on the raised portion;
wherein at least a portion of the base plate is received in the sliding groove, and the raised portion of the base plate contacts the inner wall of the sliding groove under a pressure at a locked position and wherein the first through hole renders elasticity to the base plate and facilitate deformation of the raised portion during an assembling process.

8. The connection assembly of claim 7, wherein the base plate includes two raised portions along the lengthwise direction, and two first through holes are disposed on the raised portions.

9. The connection assembly of claim 8, further includes a second through hole positioned in a middle portion of the base plate to further increase elasticity of the base plate.

10. The connection assembly of claim 7, wherein the connector includes a hook and the main surface of the bracket includes a clip and the hook engages with the clip at the locked position.

11. The connection assembly of claim 7, wherein the base plate includes a projection protruded from a bottom surface at a direction perpendicular to the bottom surface and positioned at a middle portion of the base plate, and the bracket includes a recess concaved from the main surface, and wherein the projection is received in the recess to prevent further movement at the locked position.

12. The connection assembly of claim 7, wherein the bracket includes two sliding grooves, and both edges of the base plate include the raised portions, and wherein the raised portions contact the inner walls of the two sliding grooves, respectively at the locked position.

13. The connection assembly of claim 7, wherein the connector is a wiring holder in the vehicle and further includes a wiring grasp member disposed above the base plate and configured to hold a wiring.

* * * * *